United States Patent
Sakhnini et al.

(10) Patent No.: US 11,595,104 B2
(45) Date of Patent: Feb. 28, 2023

(54) DYNAMICALLY INDICATING UNAVAILABLE BEAMS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/301,740

(22) Filed: Apr. 13, 2021

(65) Prior Publication Data
US 2021/0409093 A1    Dec. 30, 2021

Related U.S. Application Data

(60) Provisional application No. 63/043,411, filed on Jun. 24, 2020.

(51) Int. Cl.
| | |
|---|---|
| H04B 7/06 | (2006.01) |
| H04W 72/04 | (2023.01) |
| H04W 72/044 | (2023.01) |
| H04W 16/28 | (2009.01) |
| H04W 80/02 | (2009.01) |
| H04W 56/00 | (2009.01) |

(52) U.S. Cl.
CPC .......... *H04B 7/0695* (2013.01); *H04W 16/28* (2013.01); *H04W 56/001* (2013.01); *H04W 72/042* (2013.01); *H04W 72/046* (2013.01); *H04W 72/0493* (2013.01); *H04W 80/02* (2013.01)

(58) Field of Classification Search
CPC ... H04W 48/04; H04W 24/10; H04W 40/244; H04W 48/16
See application file for complete search history.

(56) References Cited

U.S. PATENT DOCUMENTS

| | | | |
|---|---|---|---|
| 2014/0334293 A1* | 11/2014 | Narasimha | H04W 74/004 370/229 |
| 2015/0043363 A1* | 2/2015 | Koskinen | H04W 16/14 370/252 |
| 2018/0213456 A1* | 7/2018 | Jheng | H04W 76/20 |
| 2019/0098520 A1 | 3/2019 | Kim | |
| 2020/0137657 A1* | 4/2020 | Chavva | H04W 76/19 |
| 2020/0396688 A1* | 12/2020 | Hong | H04W 24/10 |
| 2021/0037403 A1* | 2/2021 | Kim | H04W 56/001 |
| 2021/0184748 A1* | 6/2021 | Luo | H04W 52/143 |

OTHER PUBLICATIONS

International Search Report and Written Opinion—PCT/US2021/070447—ISA/EPO—dated Jul. 23, 2021.

* cited by examiner

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication identifying one or more blocked beams that are unavailable to use for uplink or downlink communication. The UE may determine one or more beams to use for communication with the base station based at least in part on the indication identifying the one or more blocked beams. Numerous other aspects are provided.

30 Claims, 9 Drawing Sheets

DYNAMICALLY INDICATING UNAVAILABLE BEAMS

CROSS-REFERENCE TO RELATED APPLICATION

This patent application claims priority to U.S. Provisional Patent Application No. 63/043,411, filed on Jun. 24, 2020, entitled "DYNAMICALLY INDICATING UNAVAILABLE BEAMS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamically indicating unavailable beams.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving, from a base station, an indication identifying one or more blocked beams that are unavailable to use for uplink or downlink communication; and determining one or more beams to use for communication with the base station based at least in part on the indication identifying the one or more blocked beams.

In some aspects, a method of wireless communication performed by a base station includes: transmitting, to a UE, an indication identifying one or more blocked beams that are unavailable to use for uplink or downlink communication; and determining one or more beams to use for communication with the UE based at least in part on the indication identifying the one or more blocked beams.

In some aspects, a UE for wireless communication includes: a memory; and one or more processors operatively coupled to the memory, the memory and the one or more processors configured to: receive, from a base station, an indication identifying one or more blocked beams that are unavailable to use for uplink or downlink communication; and determine one or more beams to use for communication with the base station based at least in part on the indication identifying the one or more blocked beams.

In some aspects, a base station for wireless communication includes: a memory; and one or more processors operatively coupled to the memory, the memory and the one or more processors configured to: transmit, to a UE, an indication identifying one or more blocked beams that are unavailable to use for uplink or downlink communication; and determine one or more beams to use for communication with the UE based at least in part on the indication identifying the one or more blocked beams.

In some aspects, a non-transitory computer-readable medium storing one or more instructions for wireless communication includes: one or more instructions that, when executed by one or more processors of a UE, cause the one or more processors to: receive, from a base station, an indication identifying one or more blocked beams that are unavailable to use for uplink or downlink communication; and determine one or more beams to use for communication with the base station based at least in part on the indication identifying the one or more blocked beams.

In some aspects, a non-transitory computer-readable medium storing one or more instructions for wireless communication includes: one or more instructions that, when executed by one or more processors of a base station, cause the one or more processors to: transmit, to a UE, an indication identifying one or more blocked beams that are unavailable to use for uplink or downlink communication; and determine one or more beams to use for communication with the UE based at least in part on the indication identifying the one or more blocked beams.

In some aspects, an apparatus for wireless communication includes: means for receiving, from a base station, an indication identifying one or more blocked beams that are unavailable to use for uplink or downlink communication; and means for determining one or more beams to use for communication with the base station based at least in part on the indication identifying the one or more blocked beams.

In some aspects, an apparatus for wireless communication includes: means for transmitting, to a UE, an indication identifying one or more blocked beams that are unavailable to use for uplink or downlink communication; and means for determining one or more beams to use for communication with the UE based at least in part on the indication identifying the one or more blocked beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
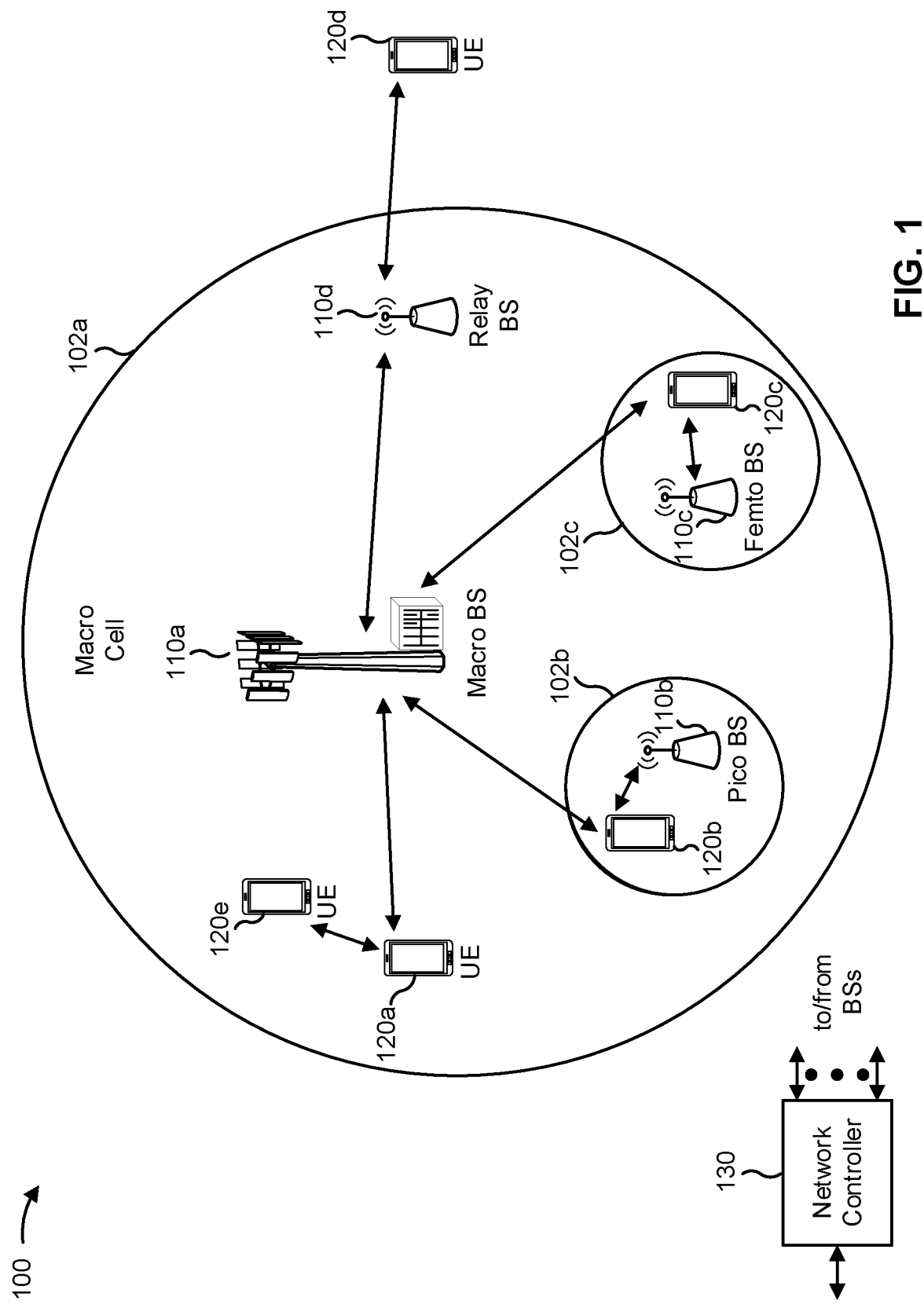
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a base station 110 may serve different UEs 120 of different categories, different UEs 120 that support different capabilities, and/or the like. For example, the base station 110 may serve a first UE 120f that has a less advanced capability (e.g., a lower capability, a reduced capability, and/or the like) and a second UE 120g that has a more advanced capability (e.g., a higher capability). For example, the first UE 120f may be a first category of UE (e.g., a reduced capability (RedCap) UE, an NR-Lite UE, a low tier UE, and/or the like), and the second UE 120g may be a second category of UE (e.g., a premium UE, an NR UE, a legacy UE, a high tier UE, and/or the like). Additionally, or alternatively, the first UE 120f may have a reduced feature set compared to the second UE 120g. In some aspects, the first UE 120f may include an MTC UE, and eMTC UE, an IoT UE, and/or the like, as described above.

For example, UEs of the first category may support a lower maximum modulation and coding scheme (MCS) than UEs of the second category (e.g., quadrature phase shift keying (QPSK) and/or the like as compared to 256-quadrature amplitude modulation (QAM) and/or the like), may support a lower transmit power than UEs of the second category, may have a less advanced beamforming capability than UEs of the second category, may be incapable of communicating on as wide of a maximum bandwidth part as UEs of the second category, may have fewer antennas (e.g., transmit antennas and/or receive antennas) and/or antenna ports than UEs of the second category, may not be capable of full duplex communication (e.g., for frequency division duplexing (FDD)), may have a lower power class than UEs of the second category, may have a relaxed UE processing timeline or capability as compared to UEs of the second category, and/or the like.

As indicated above, FIG. 1 is provided as an example. Other examples may differ from what is described with regard to FIG. 1.

Figure 2:
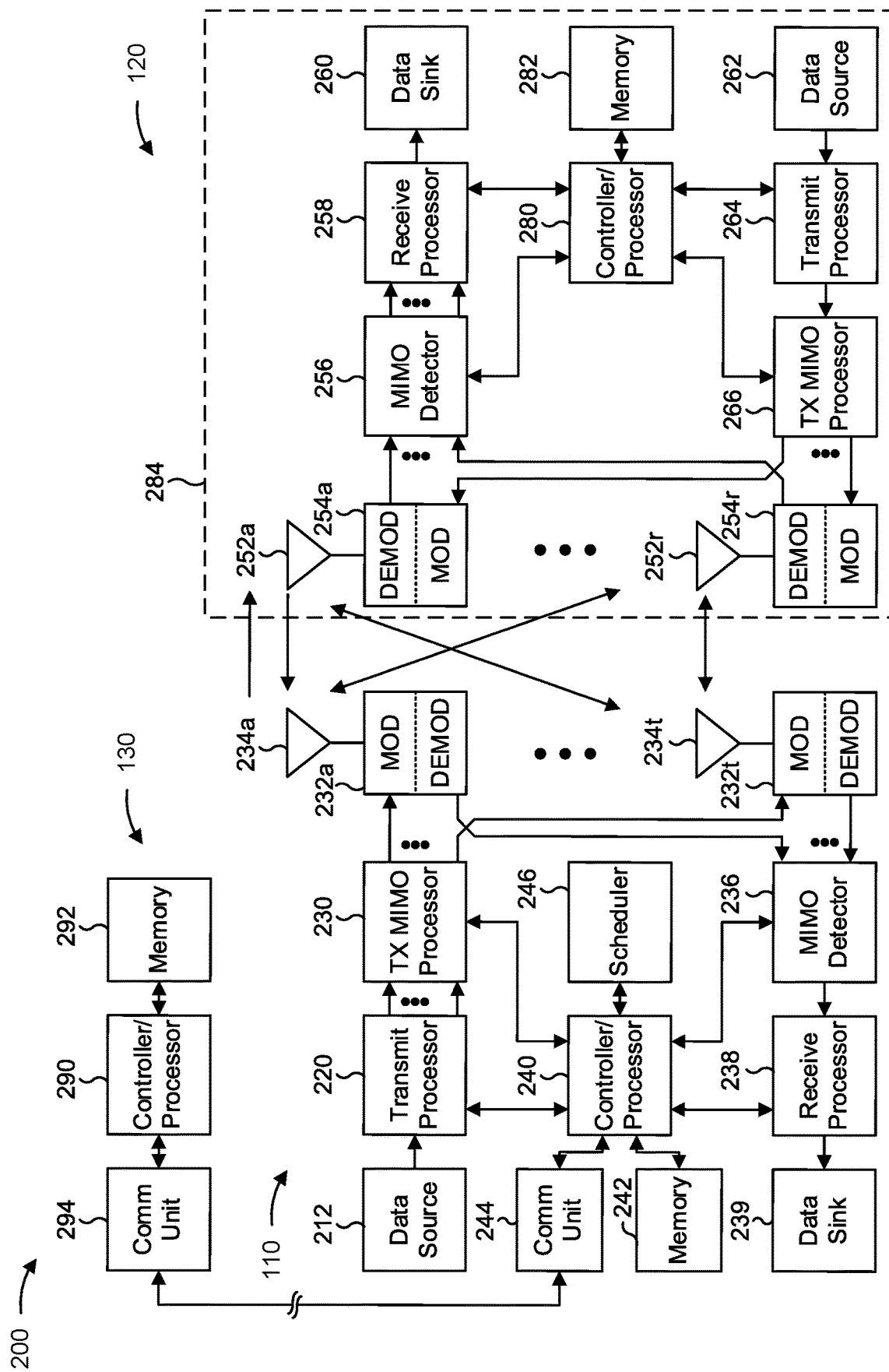
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with dynamically indicating unavailable beams, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from base station 110, an indication identifying one or more blocked beams that are unavailable to use for uplink or downlink communication, means for determining one or more beams to use for communication with base station 110 based at least in part on the indication identifying the one or more blocked beams, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, an indication identifying one or more blocked beams that are unavailable to use for uplink or downlink communication, means for determining one or more beams to use for communication with UE 120 based at least in part on the indication identifying the one or more blocked beams, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
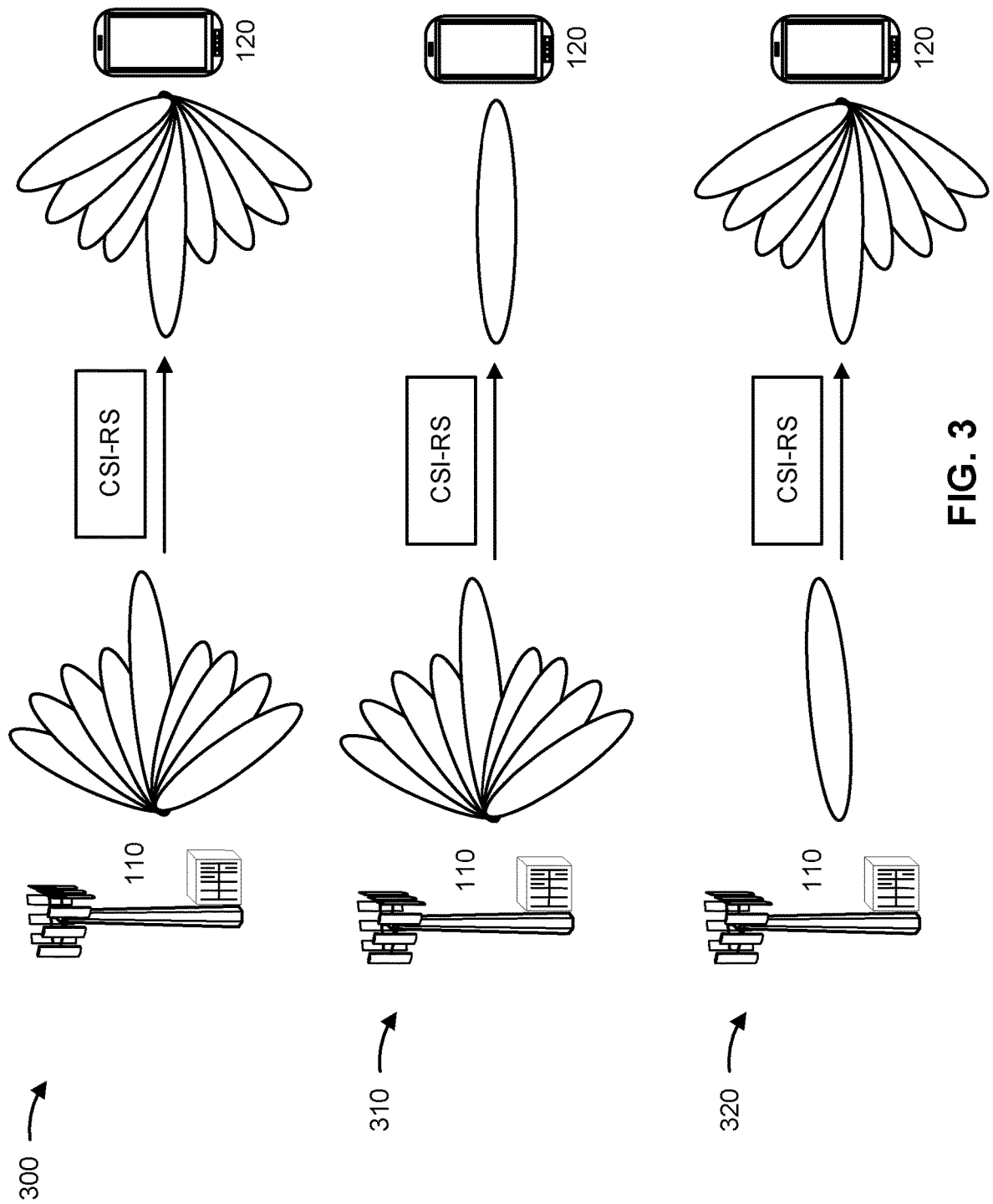
FIG. 3 is a diagram illustrating examples of beam management procedures, in accordance with the present disclosure.

FIG. 3 is a diagram illustrating examples 300, 310, and 320 of beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like). While examples 300, 310, 320 relate to beam management procedures that are described below in connection with channel state information reference signals (CSI-RSs), the beam management procedures may use synchronization signal blocks (SSBs) for beam management in a similar manner as described herein.

As shown in FIG. 3, example 300 may include a base station 110 and a UE 120 communicating to perform beam management using CSI-RSs. Example 300 depicts a first beam management procedure (e.g., a P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, the base station 110 may transmit CSI-RSs to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, each CSI-RS on a transmit beam can be transmitted with repetitions (e.g., multiple times) in the same RS resource set so that the UE 120 can sweep through receive beams in multiple transmission instants. For example, if the base station 110 has a set of N transmit beams and the UE 120 has a set of M receive beams, the CSI-RS may be transmitted on each of the N transmit beams M times so that the UE 120 may receive M beams per transmit beam. In other words, for each transmit beam of the base station 110, the UE 120 may perform beam sweeping through the M receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for uplink and/or downlink communication between the base station 110 and the UE 120.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on reported measurements received from the UE 120 (e.g., using the single receive beam).

As shown in FIG. 3, example 320 may include a base station 110 and a UE 120 communicating to perform beam management using CSI-RSs. Example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs on a single transmit beam (e.g., determined based at least in part on measurements reported by the UE 120 in connection with the first beam management procedure and/or the second beam management procedure). To enable the UE 120 to perform receive beam sweeping, the CSI-RS on the transmit beam can be transmitted repeatedly multiple times in the same reference signal resource set so that UE 120 can sweep through one or more receive beams in multiple transmission instants. The one or more receive beams may be a subset of all receive beams associated with the UE 120 (e.g., determined based at least in part on measurements performed in connection with the first beam management procedure described above and/or the second beam management procedure described above). The third beam management procedure may enable the base station 110 and/or the UE 120 to select a best receive beam based at least in part on reported measurements received from the UE 120 (e.g., of the CSI-RS on the transmit beam using the one or more receive beams).

As indicated above, FIG. 3 is provided as an example. Other examples may differ from what is described with respect to FIG. 3.

Figure 4:
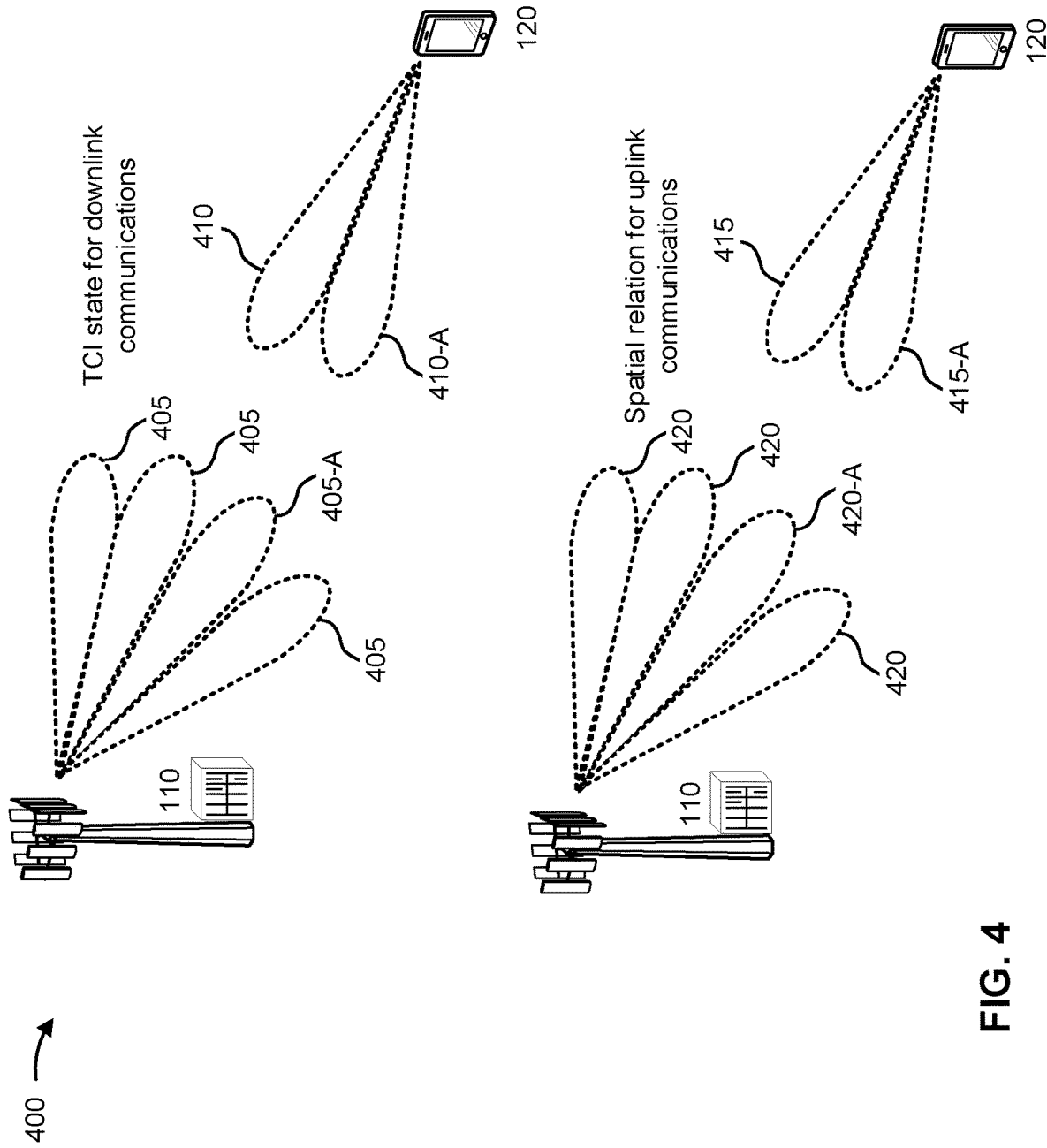
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, example 400 includes a UE 120 in communication with a base station 110 in a wireless network (e.g., wireless network 100). However, the devices shown in FIG. 4 are provided as examples, and the wireless network may support beamformed communication between other devices (e.g., between a UE 120 and a base station 110 or TRP, between a mobile termination node and a control node, between an IAB child node and an IAB parent node, between a scheduled node and a scheduling node, and/or the like).

In some aspects, the base station 110 may transmit information to UEs 120 located within a coverage area of the base station 110. The base station 110 and the UE 120 may be configured for beamformed communications, where the base station 110 may transmit in the direction of the UE 120 using a directional base station transmit beam, and the UE 120 may receive the transmission using a directional UE receive beam. Each base station transmit beam may have an associated beam ID, beam direction, beam symbols, and/or the like. The base station 110 may transmit downlink communications via one or more base station transmit beams 405.

The UE 120 may attempt to receive downlink transmissions via one or more UE receive beams 410, which may be configured using different beamforming parameters at receive circuitry of the UE 120. The UE 120 may identify a particular base station transmit beam 405, shown as base station transmit beam 405-A, and a particular UE receive beam 410, shown as UE receive beam 410-A, that provide relatively favorable performance (e.g., that have a best channel quality of the different measured combinations of base station transmit beams 405 and UE receive beams 410). In some examples, the UE 120 may transmit an indication of which base station transmit beam 405 is identified by the UE 120 as a preferred base station transmit beam, which the base station 110 may select for transmissions to the UE 120. The UE 120 may thus attain and maintain a beam pair link (BPL) with the base station 110 for downlink communications (e.g., a combination of the base station transmit beam 405-A and the UE receive beam 410-A), which may be further refined and maintained in accordance with one or more established beam refinement procedures.

A downlink beam, such as a base station transmit beam 405 or a UE receive beam 410, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, spatial receive parameters, and/or the like. In some examples, each base station transmit beam 405 may be associated with an SSB, and the UE 120 may indicate a preferred base station transmit beam 405 by transmitting uplink transmissions in resources of the SSB that are associated with the preferred base station transmit beam 405. A particular SSB may have an associated TCI state (e.g., for an antenna port or for beamforming). The base station 110 may, in some examples, indicate a downlink base station transmit beam 405 based at least in part on antenna port QCL properties that may be indicated by the TCI state. A TCI state may be associated with one downlink reference signal set (e.g., an SSB and an aperiodic, periodic, or semi-persistent CSI-RS) for different QCL types (e.g., QCL types for different combinations of Doppler shift, Doppler spread, average delay, delay spread, spatial receive parameters, and/or the like). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a base station transmit beam 405 via a TCI state indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (e.g., activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional base station receive beam. Each UE transmit beam may have an associated beam ID, beam direction, beam symbols, and/or the like. The UE 120 may transmit uplink communications via one or more UE transmit beams 415.

The base station 110 may receive uplink transmissions via one or more base station receive beams 420. The base station 110 may identify a particular UE transmit beam 415, shown as UE transmit beam 415-A, and a particular base station receive beam 420, shown as base station receive beam 420-A, that provide relatively favorable performance (e.g., that have a best channel quality of the different measured combinations of UE transmit beams 415 and base station receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (e.g., a combination of the UE transmit beam 415-A and the base station receive beam 420-A), which may be further refined and maintained in accordance with one or more established beam refinement procedures. An uplink beam, such as a UE transmit beam 415 or a base station receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

As described above in connection with FIG. 1, a base station may serve different UEs of different categories, different UEs that support different capabilities, and/or the like. For example, the base station may serve a first category of UEs that have a less advanced capability (e.g., a low tier UE, a lower capability UE, a reduced capability UE, an NR-Lite UE, and/or the like) and a second category of UEs that have a more advanced capability (e.g., a higher capability UE, a high tier UE, a premium UE, an NR UE, a legacy UE, and/or the like). In this case, UEs of the first category may include non-stationary UEs (e.g., wearable devices and/or the like) and/or stationary UEs (e.g., industrial wireless sensors, video surveillance cameras, and/or the like). For stationary UEs, a distribution of the UEs within a coverage area of a base station may be such that certain beams are used to serve many more UEs than other beams, leading to overloading of those beams. In addition, stationary UEs may cause additional beam direction constraints at certain times. For example, other (e.g., non-stationary) UEs using different beam directions may experience delays due to beams being utilized for stationary UEs. The delays may particularly affect preconfigured messages, such as PDCCH communications, semi persistent scheduling (SPS) communications, configured grant (CG) communications, and/or the like.

To reduce beam overloading and blockage for UEs other than the stationary UEs, the base station may dynamically manage communications in time (e.g., by adding delays) and/or dynamically manage UE downlink assignments to allow beams to be free for the UEs other than the stationary UEs. However, dynamically managing communications in time and/or dynamically managing UE beam assignments may increase complexity of scheduler, time management, beam management, and/or other functions of the base station, especially in cases where the base station is serving a large number of UEs. This may adversely affect network speed, reliability and/or the like, and consume computing resources (e.g., processing resources, memory resources, communication resources, and/or the like), networking resources, and/or the like.

Some aspects described herein relate to techniques and apparatuses to dynamically indicate, to a UE, one or more beams that are unavailable to use for downlink and/or uplink communication with a base station. For example, the base station may transmit an indication to the UE that identifies one or more blocked beams that are unavailable for the UE to use for downlink and/or uplink communication, whereby the UE and the base station may communicate on a downlink and/or an uplink using one or more alternate beams while the one or more blocked beams are unavailable. In this way, the one or more blocked beams may be made available for use by other UEs, which eliminates and/or mitigates beam overload conditions, enables a load to be more evenly distributed among different beams, and/or the like.

Figure 5:
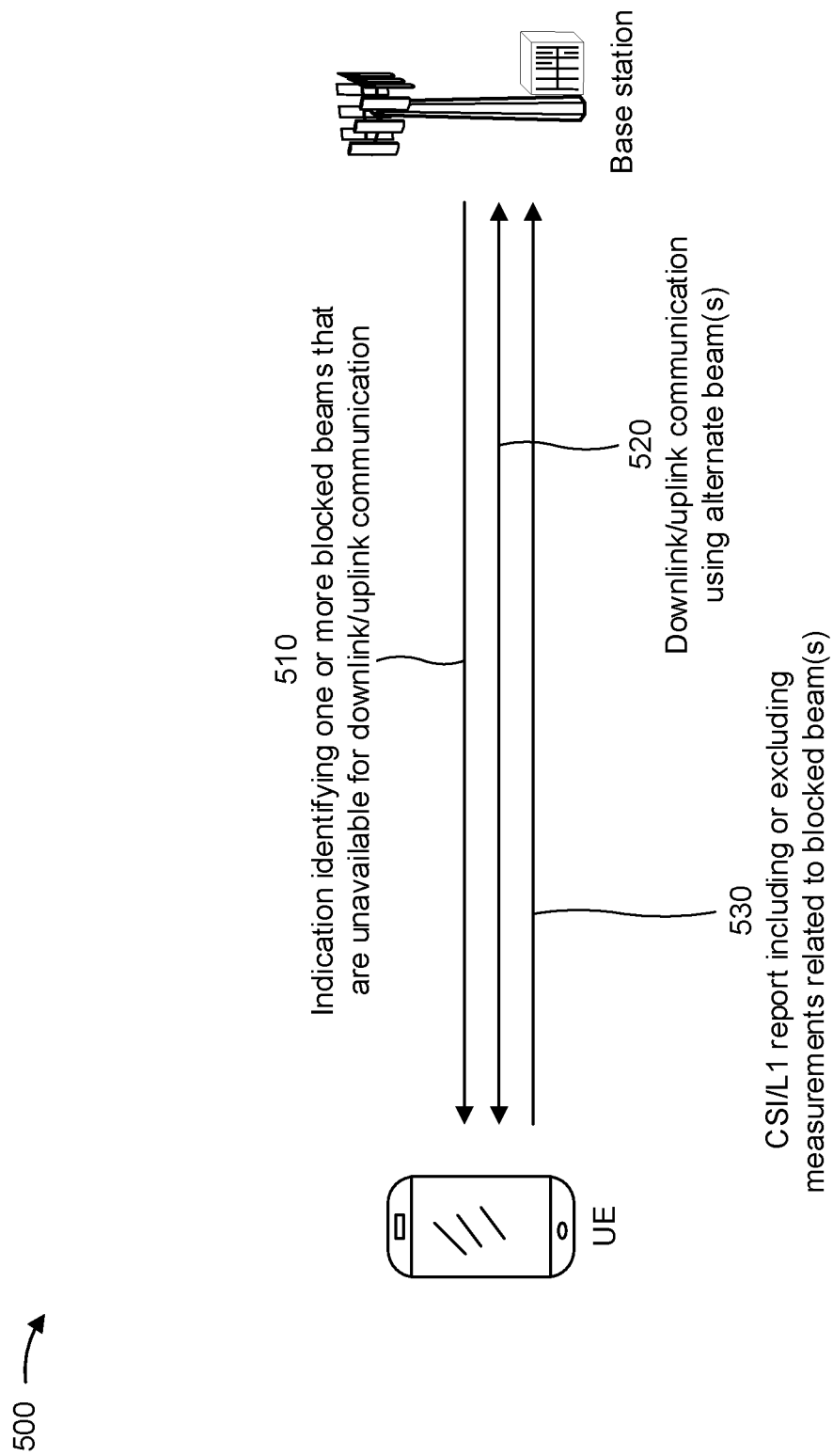
FIG. 5 is a diagram illustrating an example associated with dynamically indicating unavailable beams, in accordance with the present disclosure.

FIG. 5 is a diagram illustrating an example 500 associated with dynamically indicating unavailable beams, in accordance with the present disclosure. As shown in FIG. 5, example 500 includes a base station (e.g., base station 110) in communication with a UE (e.g., UE 120) in a wireless network (e.g., wireless network 100).

As shown in FIG. 5, and by reference number 510, the base station may transmit, and the UE may receive, an indication that identifies one or more blocked beams that are unavailable for the UE to use for downlink and/or uplink communication with the base station. For example, in some aspects, the indication may include a beam identifier, a beam direction, a beam index, and/or other suitable information to identify the one or more blocked beams that are unavailable for the UE to use for downlink and/or uplink communication with the base station. Accordingly, as described herein, the base station may generally indicate that the one or more blocked beams are unavailable for the UE to use for downlink and/or uplink communication with the base station to temporarily bar or other prevent the UE from using certain downlink and/or uplink beams. For example, the base station may determine the one or more blocked beams based at least in part on a load associated with the blocked beams and/or other beams (e.g., to distribute the load among different beams), a number of UEs that are utilizing the blocked beams and/or other beams, a category of the UE or other UEs (e.g., a reduced or low capability, a premium or high capability, and/or the like), a capability of the UE or other UEs (e.g., stationary or mobile), and/or the like. For example, in one use case, a high-priority UE may be transmitting and/or receiving high-priority data during a certain time period. In this case, based at least in part on the high-priority status of the UE, the base station may need to block other UEs from using the same beam(s) as the high-priority UE during the time in which the high-priority UE is transmitting and/or receiving high-priority data.

In some aspects, the base station may dynamically indicate the one or more blocked beams that are unavailable for the UE to use for downlink and/or uplink communication. For example, the indication may be provided in a dynamic indication message, such as a DCI message, a MAC-CE, a paging message, and/or the like. In such cases, the indication may be valid until the base station subsequently transmits a further indication to modify and/or cancel the indication that the one or more blocked beams are unavailable to use for downlink and/or uplink communication (e.g., the one or more blocked beams are unavailable until further notice). Additionally, or alternatively, the indication may be valid for a certain time period, which may be further indicated in the message that identifies the one or more blocked beams that are unavailable to use for downlink and/or uplink communication, indicated in RRC signaling, indicated in stored configuration information, and/or the like. Additionally, or alternatively, the base station may provide the UE with RRC configuration information that identifies a particular time pattern, which may be activated by a DCI message, a MAC-CE, a paging message, and/or the like. For example, when a high-priority UE is associated with an SPS or CG configuration in which SPS or CG occasions follow a particular pattern, the time pattern indicated in the RRC configuration may be configured to block certain beams during the SPS or CG occasions in which the high-priority UE is expected to receive and/or transmit data. Furthermore, in some aspects, the indication that identifies the one or more blocked beams may be specific to the UE, or may be applicable to a group of UEs that includes the UE (e.g., using a group common DCI message addressed to the group of UEs).

In some aspects, as described above, the one or more blocked beams may be unavailable for the UE to use for downlink and/or uplink communication. For example, in some aspects, the one or more blocked beams may be unavailable to use for one or more specific channels and/or messages (e.g., the one or more blocked beams may be unavailable to use for all PDSCH transmissions, all PUSCH transmissions, all CORESETs with a certain identifier, all uplink transmissions associated with a particular CG configuration, all downlink transmissions associated with a particular SPS configuration, and/or the like. Additionally, or alternatively, the one or more blocked beams may be indicated as unavailable for all downlink channels and/or messages, all uplink channels and/or messages, or all downlink and uplink channels and/or messages during the time period or time pattern in which the blockage indication is valid.

As further shown in FIG. 5, and by reference number 520, the UE and the base station may communicate on a downlink and/or an uplink using one or more alternate beams (e.g., excluding the one or more blocked beams). In some aspects, the UE and the base station may each be configured to determine the one or more alternate beams to be used for downlink and/or uplink communication based at least in part on the indication identifying the one or more blocked beams. For example, the alternate beam(s) to be used for downlink and/or uplink communication may be explicitly indicated in the message indicating the one or more blocked beams. Additionally, or alternatively, the UE may be provided with RRC configuration information that indicates the one or more alternate beams. For example, the RRC configuration may indicate one or more beams that are to be used for downlink and/or uplink communication when a certain beam is blocked or otherwise unavailable (e.g., the RRC configuration information may indicate the beam(s) to be used as the backup or alternate beam(s) for downlink and/or uplink beams). In this way, when the base station indicates that one or more blocked beams are unavailable to use for downlink and/or uplink communication, the UE and the base station may each determine the alternate beam(s) to be used based at least in part on the explicit indication or the RRC configuration information without disrupting downlink and/or uplink communication.

Additionally, or alternatively, the UE and the base station may determine the alternate beam(s) to be used based at least in part on one or more implicit rules. For example, in some aspects, the implicit rules may indicate one or more beams that are to be used for downlink and/or uplink communication based at least in part on a type of communication for which the one or more blocked beams are unavailable.

For example, where the one or more blocked beams are unavailable for PDSCH communication, the implicit rules may indicate the alternate beam(s) to be used for downlink communication in cases where a time offset between a DCI message and a PDSCH scheduled by the DCI message is less than a configured value for a parameter (e.g., a timeDurationForQCL parameter) that defines a minimum number of symbols that the UE requires to perform PDCCH reception and apply spatial QCL information received in the DCI before processing the PDSCH. In such cases, where the time offset between the DCI message and the PDSCH scheduled by the DCI message is less than the configured value for the timeDurationForQCL (or similar) parameter, the PDSCH is quasi co-located (QCLed) with a demodulation reference signal (DMRS) for a CORESET having a lowest identifier. Accordingly, in cases where one TCI state is configured and one or more beams are blocked or otherwise unavailable, the PDSCH may be QCLed with the PDCCH DMRS for the CORESE with the lowest identifier (e.g., the lowest controlResourceSetId) among the non-blocked (e.g., available) TCI states in the latest slot. Alternatively, in cases where two TCI states are configured and one or more beams are blocked or otherwise unavailable, the PDSCH may use a TCI state corresponding to a lowest codepoint among TCI state codepoints that contain two different TCI states that are not blocked or otherwise unavailable. In another example, in cases where the scheduling DCI and the PDSCH are associated with different component carriers, the PDSCH may use an activated TCI state with a lowest identifier among available TCI states applicable to the PDSCH in the active bandwidth part of the scheduled cell (e.g., the component carrier on which the PDSCH is scheduled). Accordingly, in cases where implicit rules are used to determine the alternate beam(s) to be used, the implicit rules may generally be constrained to limit the alternate beams to a subset of beams that are not blocked or otherwise unavailable.

Furthermore, in some aspects, the UE may determine a QCL association for one or more downlink and/or uplink channels that are associated with a blocked SSB beam, a blocked CSI-RS beam, and/or the like. In particular, when downlink and/or uplink channel is QCLed with a certain SSB beam or CSI-RS beam that is blocked or otherwise unavailable, the UE may need to determine another SSB beam or CSI-RS beam to use as a QCL association in order to receive the downlink channel or transmit the uplink channel. Accordingly, in some aspects, the alternate SSB beam or alternate CSI-RS beam to use as a QCL association for the downlink and/or uplink channels that are QCLed with blocked SSB or CSI-RS beams may be explicitly indicated by the base station (e.g., in the message indicating the blocked beams), in RRC configuration information, and/or the like.

In some aspects, the UE may temporarily refrain from conducting certain communication operations in cases where one or more alternate beams are not available (e.g., because the base station did not indicate the alternate beams, the UE did not receive RRC configuration information indicating the alternate beams, or implicit rules are inapplicable, such as when there is only one TCI state configured and the one TCI state is blocked). For example, in cases where downlink messages are associated with one or more blocked TCI states and no alternate TCI state is available, the UE may refrain from monitoring downlink messages (e.g., PDCCH and/or PDSCH messages) associated with the blocked TCI states while the blockage is valid. Additionally, or alternatively, in cases where uplink messages are associated with a spatial relationship that are part of a blocked TCI state and no alternate spatial relationship is available, the UE may refrain from sending uplink messages (e.g., PUCCH and/or PUSCH messages) associated with the blocked TCI state while the blockage is valid.

As further shown in FIG. 5, and by reference number 530, the UE may transmit, and the base station may receive, one or more channel state information (CSI) or Layer-1 (L1) reports. For example, in some aspects, the UE may be configured to transmit one or more periodic, semi-persistent, or aperiodic CSI or L1 reports as part of a radio link management (RLM) procedure, a radio resource management (RRM) procedure, a beam failure recovery (BFR) procedure, a beam failure detection (BFD) procedure, and/or the like. Accordingly, when the UE is blocked from using one or more beams, the UE may determine whether to include or exclude measurements related to the blocked beams. For example, in some aspects, the base station may indicate whether the UE is to include or exclude measurements related to the blocked beams (e.g., in a DCI message, MAC-CE, RRC configuration, and/or the like), or behavior of the UE with respect to including or excluding measurements related to the blocked beams may be specified in other (e.g., stored) configuration information. Accordingly, in cases where the one or more blocked beams are unavailable to use for communication but not blocked for measurement, the report transmitted to the base station may include measurements related to the one or more blocked beams. Alternatively, in cases where the one or more blocked beams are unavailable to use for communication and are also blocked for measurement, measurements related to the one or more blocked beams may be excluded from the report transmitted to the base station.

As indicated above, FIG. 5 is provided as an example. Other examples may differ from what is described with respect to FIG. 5.

Figure 6:
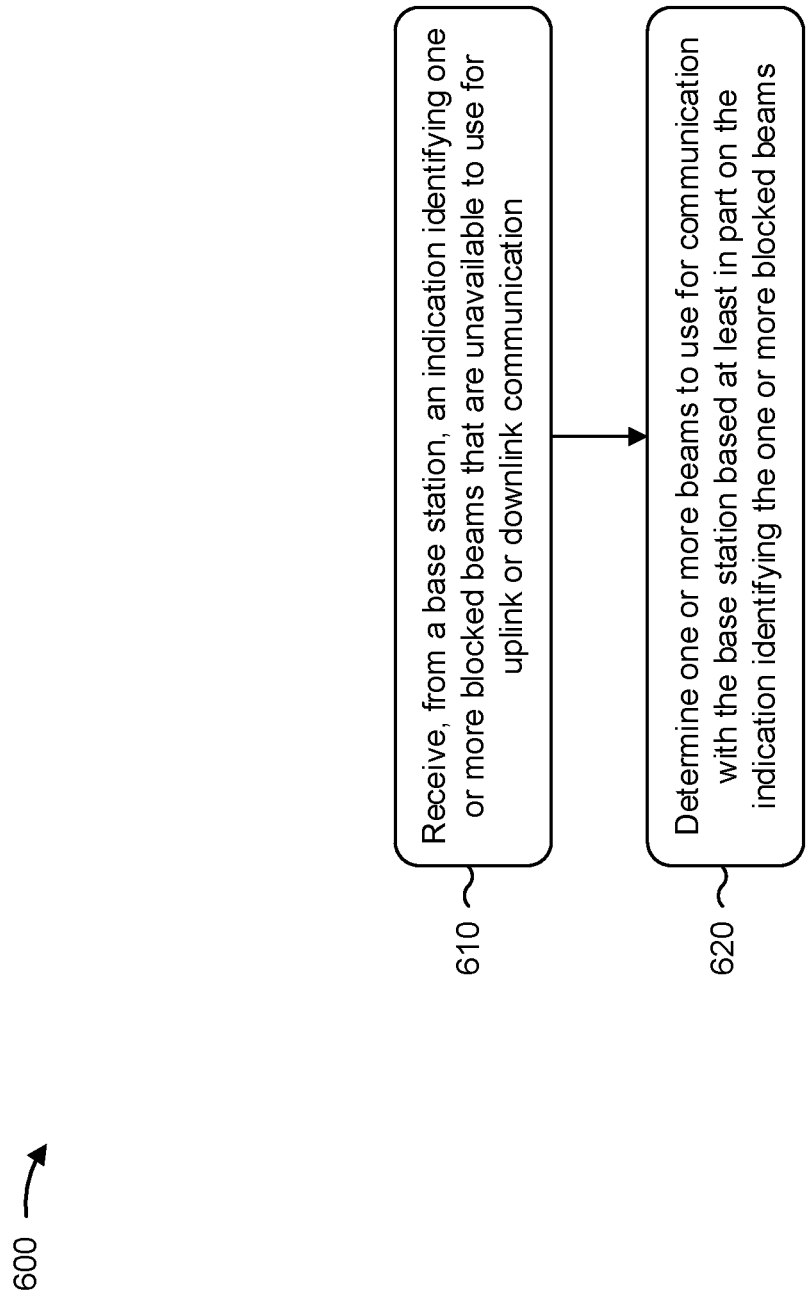
FIGS. 6-7 are diagrams illustrating examples associated with dynamically indicating unavailable beams, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with dynamically indicating unavailable beams.

As shown in FIG. 6, in some aspects, process 600 may include receiving, from a base station, an indication identifying one or more blocked beams that are unavailable to use for uplink or downlink communication (block 610). For example, the UE may receive (e.g., using antenna 252, DEMOD 254, MIMO detector 256, receive processor 258, controller/processor 280, memory 282, and/or the like), from a base station, an indication identifying one or more blocked beams that are unavailable to use for uplink or downlink communication, as described above.

As further shown in FIG. 6, in some aspects, process 600 may include determining one or more beams to use for communication with the base station based at least in part on the indication identifying the one or more blocked beams (block 620). For example, the UE may determine (e.g., using controller/processor 280, memory 282, and/or the like) may determine one or more beams to use for communication with the base station based at least in part on the indication identifying the one or more blocked beams, as described above.

Process 600 may include additional aspects, such as any single aspect or any combination of aspects described below and/or in connection with one or more other processes described elsewhere herein.

In a first aspect, the one or more blocked beams are dynamically indicated in a DCI message, a MAC-CE, or a paging message.

In a second aspect, alone or in combination with the first aspect, the one or more blocked beams are unavailable to use for uplink or downlink communication for a configured time period or until a subsequent indication is received indicating that the one or more blocked beams are available to use for uplink or downlink communication.

In a third aspect, alone or in combination with one or more of the first and second aspects, the one or more blocked beams are unavailable to use for uplink or downlink communication for a configured time pattern that is configured in RRC signaling and activated by a DCI message or a MAC-CE that includes the indication identifying the one or more blocked beams.

In a fourth aspect, alone or in combination with one or more of the first through third aspects, the indication further identifies one or more channels or messages for which the one or more blocked beams are unavailable to use for uplink or downlink communication.

In a fifth aspect, alone or in combination with one or more of the first through fourth aspects, the indication indicates that the one or more blocked beams are unavailable to use for all uplink or all downlink communication.

In a sixth aspect, alone or in combination with one or more of the first through fifth aspects, the indication is specific to the UE or to a group of UEs that includes the UE.

In a seventh aspect, alone or in combination with one or more of the first through sixth aspects, the indication further identifies the one or more beams to use for communication with the base station.

In an eighth aspect, alone or in combination with one or more of the first through seventh aspects, the one or more beams to use for communication with the base station are determined based at least in part on RRC configuration information.

In a ninth aspect, alone or in combination with one or more of the first through eighth aspects, the one or more beams to use for communication with the base station are determined based at least in part on one or more rules that relate to a type of communication for which the one or more blocked beams are unavailable.

In a tenth aspect, alone or in combination with one or more of the first through ninth aspects, process 600 includes determining one or more downlink or uplink channels that are QCLed with the one or more blocked beams based at least in part on the one or more blocked beams including one or more SSB or CSI-RS beams, and selecting one or more alternate SSB or CSI-RS beams to use as a QCL association for the one or more downlink or uplink channels that are QCLed with the one or more blocked beams.

In an eleventh aspect, alone or in combination with one or more of the first through tenth aspects, the one or more alternate SSB or CSI-RS beams are indicated by the base station or an RRC configuration.

In a twelfth aspect, alone or in combination with one or more of the first through eleventh aspects, process 600 includes refraining from monitoring downlink messages associated with one or more TCI states that correspond to the one or more blocked beams while the one or more blocked beams are unavailable.

In a thirteenth aspect, alone or in combination with one or more of the first through twelfth aspects, process 600 includes refraining from transmitting uplink messages associated with one or more channels having spatial relationships with one or more TCI states that correspond to the one or more blocked beams while the one or more blocked beams are unavailable.

In a fourteenth aspect, alone or in combination with one or more of the first through thirteenth aspects, process 600 includes transmitting, to the base station, a report that includes one or more beam measurements, wherein the one or more beam measurements include measurements related to the one or more blocked beams.

In a fifteenth aspect, alone or in combination with one or more of the first through fourteenth aspects, process 600 includes transmitting, to the base station, a report that includes one or more beam measurements, wherein measurements relating to the one or more blocked beams are excluded from the report.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
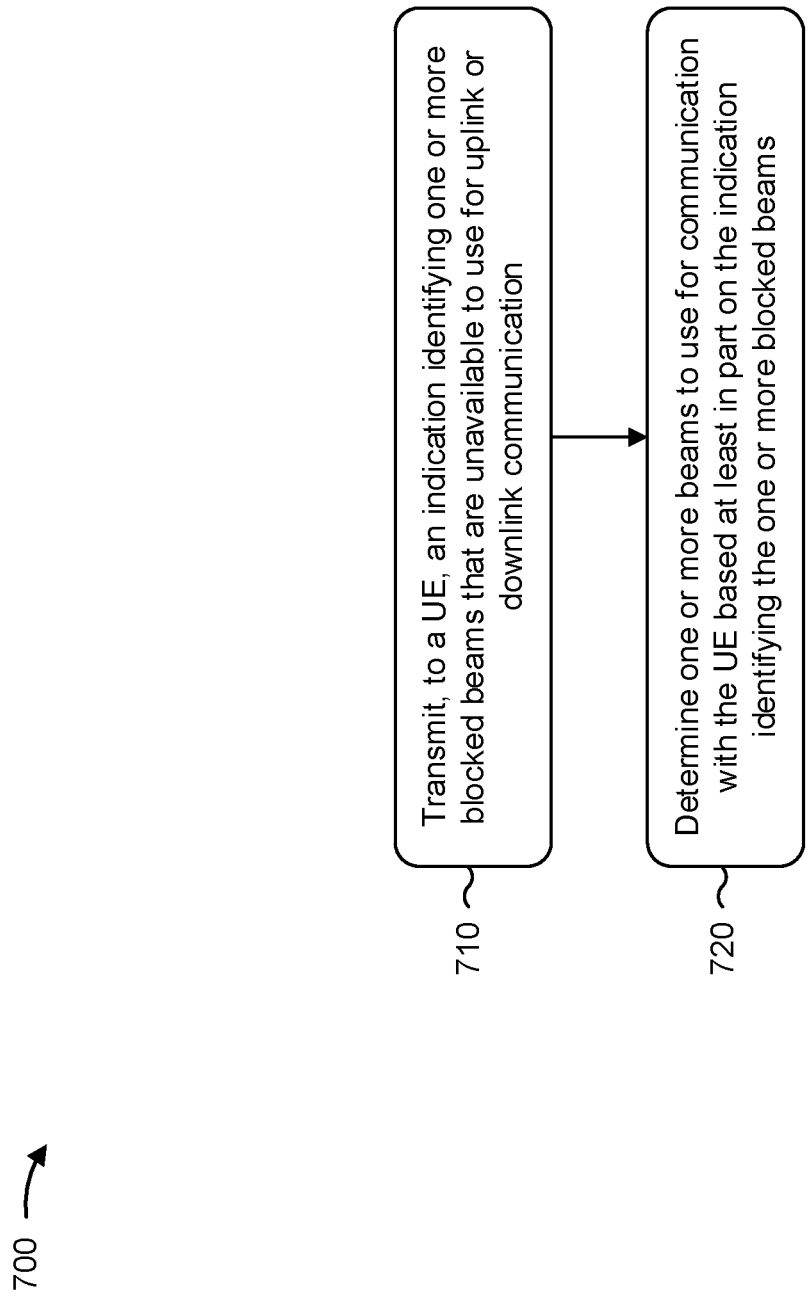

FIG. 7 is a diagram illustrating an example process 700 performed, for example, by a base station, in accordance with the present disclosure. Example process 700 is an example where the base station (e.g., base station 110 and/or the like) performs operations associated with dynamically indicating unavailable beams.

As shown in FIG. 7, in some aspects, process 700 may include transmitting, to a UE, an indication identifying one or more blocked beams that are unavailable to use for uplink or downlink communication (block 710). For example, the base station may transmit (e.g., using controller/processor 240, transmit processor 220, TX MIMO processor 230, MOD 232, antenna 234, memory 242, and/or the like), to a UE, an indication identifying one or more blocked beams that are unavailable to use for uplink or downlink communication, as described above.

As further shown in FIG. 7, in some aspects, process 700 may include determining one or more beams to use for communication with the UE based at least in part on the indication identifying the one or more blocked beams (block 720). For example, the base station may determine (e.g., using controller/processor 240, memory 242, and/or the like) one or more beams to use for communication with the UE based at least in part on the indication identifying the one or more blocked beams, as described above.

Process 700 may include additional aspects, such as any single aspect or any combination of aspects described below and/or in connection with one or more other processes described elsewhere herein.

In a first aspect, the one or more blocked beams are dynamically indicated in a DCI message, a MAC-CE, or a paging message.

In a second aspect, alone or in combination with the first aspect, the one or more blocked beams are unavailable to use for uplink or downlink communication for a configured time period or until a subsequent indication is transmitted to indicate that the one or more blocked beams are available to use for uplink or downlink communication.

In a third aspect, alone or in combination with one or more of the first and second aspects, the one or more blocked beams are unavailable to use for uplink or downlink communication for a configured time pattern that is configured in RRC signaling and activated by a DCI message or a MAC-CE that includes the indication identifying the one or more blocked beams.

In a fourth aspect, alone or in combination with one or more of the first through third aspects, the indication further identifies one or more channels or messages for which the one or more blocked beams are unavailable to use for uplink or downlink communication.

In a fifth aspect, alone or in combination with one or more of the first through fourth aspects, the indication indicates that the one or more blocked beams are unavailable to use for all uplink or all downlink communication.

In a sixth aspect, alone or in combination with one or more of the first through fifth aspects, the indication is specific to the UE or to a group of UEs that includes the UE.

In a seventh aspect, alone or in combination with one or more of the first through sixth aspects, the indication further identifies the one or more beams that the UE is to use for communication with the base station.

In an eighth aspect, alone or in combination with one or more of the first through seventh aspects, the one or more beams that the UE is to use for communication with the base station are determined based at least in part on RRC configuration information.

In a ninth aspect, alone or in combination with one or more of the first through eighth aspects, the one or more beams that the UE is to use for communication with the base station are based at least in part on one or more rules that relate to a type of communication for which the one or more blocked beams are unavailable.

In a tenth aspect, alone or in combination with one or more of the first through ninth aspects, process 700 includes receiving, from the UE, a report that includes one or more beam measurements, wherein the one or more beam measurements include measurements related to the one or more blocked beams.

In an eleventh aspect, alone or in combination with one or more of the first through tenth aspects, process 700 includes receiving, from the UE, a report that includes one or more beam measurements, wherein measurements relating to the one or more blocked beams are excluded from the report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
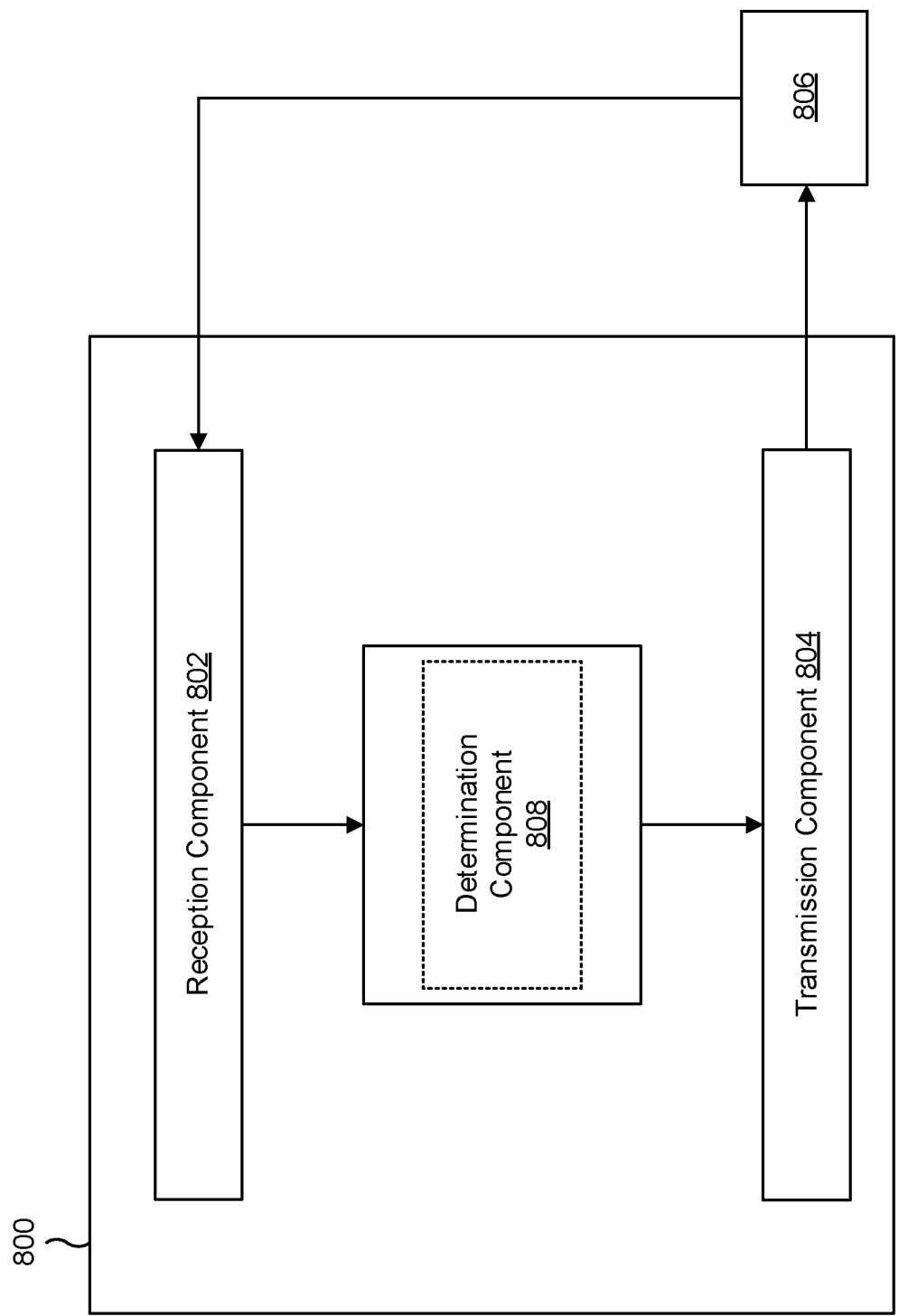
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 5. Additionally or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (e.g., filtering, amplification, demodulation, analog-to-digital conversion, demultiplexing, deinterleaving, de-mapping, equalization, interference cancellation, decoding, and/or the like), and may provide the processed signals to other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, from the apparatus 806, an indication identifying one or more blocked beams that are unavailable to use for uplink or downlink communication. The determination component 808 may determine one or more beams to use for communication with the apparatus 806 based at least in part on the indication identifying the one or more blocked beams.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
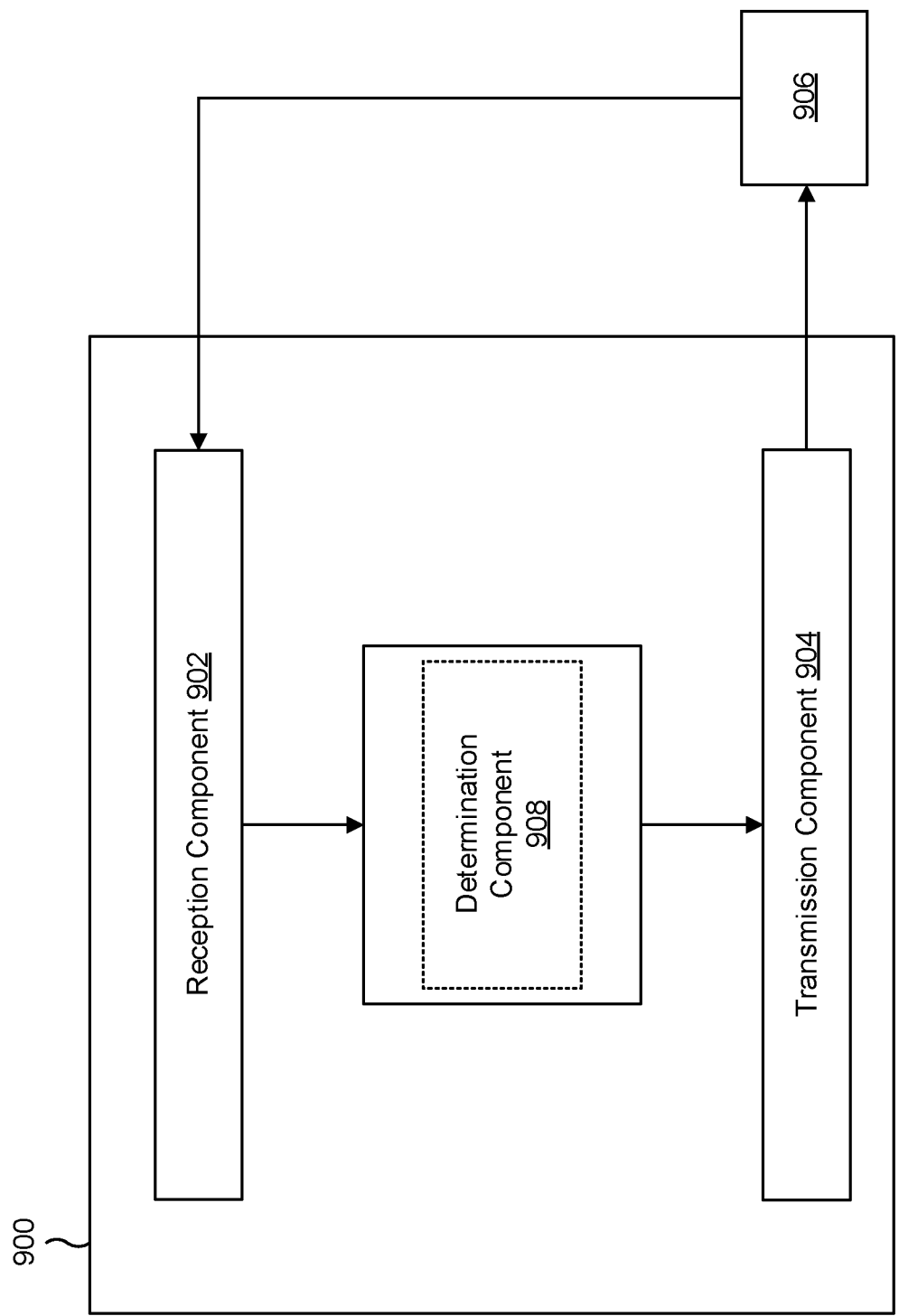

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (e.g., via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 5. Additionally or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to the apparatus 906, an indication identifying one or more blocked beams that are unavailable to use for uplink or downlink communication. The determination component 908 may determine one or more beams to use for communication with the apparatus 906 based at least in part on the indication identifying the one or more blocked beams.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a base station, an indication identifying one or more blocked beams that are unavailable to use for uplink or downlink communication; and determining one or more beams to use for communication with the base station based at least in part on the indication identifying the one or more blocked beams.

Aspect 2: The method of Aspect 1, wherein the one or more blocked beams are dynamically indicated in a DCI message, a MAC-CE, or a paging message.

Aspect 3: The method of any of Aspects 1-2, wherein the one or more blocked beams are unavailable to use for uplink or downlink communication for a configured time period or until a subsequent indication is received indicating that the one or more blocked beams are available to use for uplink or downlink communication.

Aspect 4: The method of any of Aspects 1-2, wherein the one or more blocked beams are unavailable to use for uplink or downlink communication for a configured time pattern that is configured in RRC signaling and activated by a DCI message or a MAC-CE that includes the indication identifying the one or more blocked beams.

Aspect 5: The method of any of Aspects 1-4, wherein the indication further identifies one or more channels or messages for which the one or more blocked beams are unavailable to use for uplink or downlink communication.

Aspect 6: The method of any of Aspects 1-4, wherein the indication indicates that the one or more blocked beams are unavailable to use for all uplink or all downlink communication.

Aspect 7: The method of any of Aspects 1-6, wherein the indication is specific to the UE or to a group of UEs that includes the UE.

Aspect 8: The method of any of Aspects 1-7, wherein the indication further identifies the one or more beams to use for communication with the base station.

Aspect 9: The method of any of Aspects 1-7, wherein the one or more beams to use for communication with the base station are determined based at least in part on RRC configuration information.

Aspect 10: The method of any of Aspects 1-7, wherein the one or more beams to use for communication with the base station are determined based at least in part on one or more rules that relate to a type of communication for which the one or more blocked beams are unavailable.

Aspect 11: The method of any of Aspects 1-10, further comprising: determining one or more downlink or uplink channels that are QCLed with the one or more blocked beams based at least in part on the one or more blocked beams including one or more SSB or CSI-RS beams; and selecting one or more alternate SSB or CSI-RS beams to use as a QCL association for the one or more downlink or uplink channels that are QCLed with the one or more blocked beams.

Aspect 12: The method of Aspect 11, wherein the one or more alternate SSB or CSI-RS beams are indicated by the base station or an RRC configuration.

Aspect 13: The method of any of Aspects 1-12, further comprising: refraining from monitoring downlink messages associated with one or more TCI states that correspond to the one or more blocked beams while the one or more blocked beams are unavailable.

Aspect 14: The method of any of Aspects 1-13, further comprising: refraining from transmitting uplink messages associated with one or more channels having spatial relationships with one or more TCI states that correspond to the one or more blocked beams while the one or more blocked beams are unavailable.

Aspect 15: The method of any of Aspects 1-14, further comprising: transmitting, to the base station, a report that includes one or more beam measurements, wherein the one or more beam measurements include measurements related to the one or more blocked beams.

Aspect 16: The method of any of Aspects 1-14, further comprising: transmitting, to the base station, a report that includes one or more beam measurements, wherein measurements related to the one or more blocked beams are excluded from the report.

Aspect 17: A method of wireless communication performed by a base station, comprising: transmitting, to a UE, an indication identifying one or more blocked beams that are unavailable to use for uplink or downlink communication; and determining one or more beams to use for communication with the UE based at least in part on the indication identifying the one or more blocked beams.

Aspect 18: The method of Aspect 17, wherein the one or more blocked beams are dynamically indicated in a DCI message, a MAC-CE, or a paging message.

Aspect 19: The method of any of Aspects 17-18, wherein the one or more blocked beams are unavailable to use for uplink or downlink communication for a configured time period or until a subsequent indication is transmitted to indicate that the one or more blocked beams are available to use for uplink or downlink communication.

Aspect 20: The method of any of Aspects 17-18, wherein the one or more blocked beams are unavailable to use for uplink or downlink communication for a configured time pattern that is configured in RRC signaling and activated by a DCI message or a MAC-CE that includes the indication identifying the one or more blocked beams.

Aspect 21: The method of any of Aspects 17-20, wherein the indication further identifies one or more channels or messages for which the one or more blocked beams are unavailable to use for uplink or downlink communication.

Aspect 22: The method of any of Aspects 17-20, wherein the indication indicates that the one or more blocked beams are unavailable to use for all uplink or all downlink communication.

Aspect 23: The method of any of Aspects 17-22, wherein the indication is specific to the UE or to a group of UEs that includes the UE.

Aspect 24: The method of any of Aspects 17-23, wherein the indication further identifies the one or more beams that the UE is to use for communication with the base station.

Aspect 25: The method of any of Aspects 17-23, wherein the one or more beams that the UE is to use for communication with the base station are determined based at least in part on RRC configuration information.

Aspect 26: The method of any of Aspects 17-23, wherein the one or more beams that the UE is to use for communication with the base station are based at least in part on one or more rules that relate to a type of communication for which the one or more blocked beams are unavailable.

Aspect 27: The method of any of Aspects 17-26, further comprising: receiving, from the UE, a report that includes one or more beam measurements, wherein the one or more beam measurements include measurements related to the one or more blocked beams.

Aspect 28: The method of any of Aspects 17-26, further comprising: receiving, from the UE, a report that includes one or more beam measurements, wherein measurements related to the one or more blocked beams are excluded from the report.

Aspect 29: An apparatus for wireless communication at a device, comprising a processor; memory coupled with the processor; and instructions stored in the memory and executable by the processor to cause the apparatus to perform the method of any of Aspects 1-16.

Aspect 30: A device for wireless communication, comprising a memory and one or more processors coupled to the memory, the memory and the one or more processors configured to perform the method of any of Aspects 1-16.

Aspect 31: An apparatus for wireless communication, comprising at least one means for performing the method of any of Aspects 1-16.

Aspect 32: A non-transitory computer-readable medium storing code for wireless communication, the code comprising instructions executable by a processor to perform the method of any of Aspects 1-16.

Aspect 33: A non-transitory computer-readable medium storing a set of instructions for wireless communication, the set of instructions comprising one or more instructions that, when executed by one or more processors of a device, cause the device to perform the method of any of Aspects 1-16.

Aspect 34: An apparatus for wireless communication at a device, comprising a processor; memory coupled with the processor; and instructions stored in the memory and executable by the processor to cause the apparatus to perform the method of any of Aspects 17-28.

Aspect 35: A device for wireless communication, comprising a memory and one or more processors coupled to the memory, the memory and the one or more processors configured to perform the method of any of Aspects 17-28.

Aspect 36: An apparatus for wireless communication, comprising at least one means for performing the method of any of Aspects 17-28.

Aspect 37: A non-transitory computer-readable medium storing code for wireless communication, the code comprising instructions executable by a processor to perform the method of any of Aspects 17-28.

Aspect 38: A non-transitory computer-readable medium storing a set of instructions for wireless communication, the set of instructions comprising one or more instructions that, when executed by one or more processors of a device, cause the device to perform the method of any of Aspects 17-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, an indication identifying one or more blocked beams that are unavailable to use for an uplink or downlink communication during a time period or a time pattern in which the indication is valid or until a subsequent indication is received indicating that the one or more blocked beams are available to use for a subsequent uplink or downlink communication;
   determining one or more beams to use for communication with the base station during the time period or the time pattern in which the indication is valid or until the subsequent indication is received based at least in part on the indication identifying the one or more blocked beams; and
   using the one or more blocked beams for the subsequent uplink or downlink communication based at least in part on an expiration of the time period or the time pattern in which the indication is valid or receiving the subsequent indication.

2. The method of claim 1, wherein the one or more blocked beams are unavailable to use for the uplink or downlink communication for a configured time period.

3. The method of claim 1, wherein the one or more blocked beams are unavailable to use for the uplink or downlink communication during the time pattern, wherein the time pattern is configured in radio resource control (RRC) signaling and activated by a downlink control information (DCI) message or a medium access control (MAC) control element (MAC-CE) that includes the indication identifying the one or more blocked beams.

4. The method of claim 1, wherein the indication further identifies one or more channels or messages for which the one or more blocked beams are unavailable to use for the uplink or downlink communication.

5. The method of claim 1, wherein the indication indicates that the one or more blocked beams are unavailable to use for all uplink or all downlink communication.

6. The method of claim 1, wherein the one or more beams to use for communication with the base station are determined based at least in part on radio resource control (RRC) configuration information, one or more rules that relate to a type of communication for which the one or more blocked beams are unavailable, or information in the indication that identifies the one or more beams to use for communication with the base station.

7. The method of claim 1, further comprising:
   determining one or more downlink or uplink channels that are quasi co-located (QCLed) with the one or more blocked beams based at least in part on the one or more blocked beams including one or more synchronization signal block (SSB) or channel state information reference signal (CSI-RS) beams; and
   selecting one or more alternate SSB or CSI-RS beams to use as a QCL association for the one or more downlink or uplink channels that are QCLed with the one or more blocked beams.

8. The method of claim 1, further comprising:
   refraining from monitoring downlink messages associated with one or more transmission configuration indication (TCI) states that correspond to the one or more blocked beams while the one or more blocked beams are unavailable; and
   refraining from transmitting uplink messages associated with one or more channels having spatial relationships with the one or more TCI states that correspond to the one or more blocked beams while the one or more blocked beams are unavailable.

9. The method of claim 1, further comprising:
transmitting, to the base station, a report that includes one or more beam measurements, wherein the one or more beam measurements include measurements related to the one or more blocked beams.

10. The method of claim 1, further comprising:
transmitting, to the base station, a report that includes one or more beam measurements, wherein measurements related to the one or more blocked beams are excluded from the report.

11. A method of wireless communication performed by a base station, comprising:
transmitting, to a user equipment (UE), an indication identifying one or more blocked beams that are unavailable to use for an uplink or downlink communication during a time period or a time pattern in which the indication is valid or until a subsequent indication is received by the UE indicating that the one or more blocked beams are available to use for a subsequent uplink or downlink communication;
determining one or more beams to use for communication with the UE during the time period or the time pattern in which the indication is valid or until the subsequent indication is received by the UE based at least in part on the indication identifying the one or more blocked beams; and
using the one or more blocked beams for the subsequent uplink or downlink communication based at least in part on an expiration of the time period or the time pattern in which the indication is valid or the UE receiving the subsequent indication.

12. The method of claim 11, further comprising:
transmitting the subsequent indication to indicate that the one or more blocked beams are available to use for the subsequent uplink or downlink communication.

13. The method of claim 11, wherein the one or more blocked beams are unavailable to use for the uplink or downlink communication during the time pattern, wherein the time pattern is configured in radio resource control (RRC) signaling and activated by a downlink control information (DCI) message or a medium access control (MAC) control element (MAC-CE) that includes the indication identifying the one or more blocked beams.

14. The method of claim 11, wherein the indication further identifies one or more channels or messages for which the one or more blocked beams are unavailable to use for the uplink or downlink communication.

15. The method of claim 11, wherein the indication indicates that the one or more blocked beams are unavailable to use for all uplink or all downlink communication.

16. The method of claim 11, wherein the one or more beams that the UE is to use for communication with the base station are based at least in part on radio resource control (RRC) configuration information, one or more rules that relate to a type of communication for which the one or more blocked beams are unavailable, or information in the indication identifies the one or more beams to use for communication with the base station.

17. The method of claim 11, further comprising:
receiving, from the UE, a report that includes one or more beam measurements, wherein the one or more beam measurements include measurements related to the one or more blocked beams.

18. The method of claim 11, further comprising:
receiving, from the UE, a report that includes one or more beam measurements, wherein measurements related to the one or more blocked beams are excluded from the report.

19. A user equipment (UE) for wireless communication, comprising:
a memory; and
one or more processors coupled to the memory, the one or more processors configured to:
receive, from a base station, an indication identifying one or more blocked beams that are unavailable to use for an uplink or downlink communication during a time period or a time pattern in which the indication is valid or until a subsequent indication is received indicating that the one or more blocked beams are available to use for a subsequent uplink or downlink communication;
determine one or more beams to use for communication with the base station during the time period or the time pattern in which the indication is valid or until the subsequent indication is received based at least in part on the indication identifying the one or more blocked beams; and
use the one or more blocked beams for the subsequent uplink or downlink communication based at least in part on an expiration of the time period or the time pattern in which the indication is valid or receiving the subsequent indication.

20. The UE of claim 19, wherein the one or more blocked beams are unavailable to use for the uplink or downlink communication for a configured time period.

21. The UE of claim 19, wherein the one or more blocked beams are unavailable to use for the uplink or downlink communication during the time pattern, wherein the time pattern is configured in radio resource control (RRC) signaling and activated by a downlink control information (DCI) message or a medium access control (MAC) control element (MAC-CE) that includes the indication identifying the one or more blocked beams.

22. The UE of claim 19, wherein the indication further identifies one or more channels or messages for which the one or more blocked beams are unavailable to use for the uplink or downlink communication.

23. The UE of claim 19, wherein the indication indicates that the one or more blocked beams are unavailable to use for all uplink or all downlink communication.

24. The UE of claim 19, wherein the one or more processors are further configured to:
determine one or more downlink or uplink channels that are quasi co-located (QCLed) with the one or more blocked beams based at least in part on the one or more blocked beams including one or more synchronization signal block (SSB) or channel state information reference signal (CSI-RS) beams; and
select one or more alternate SSB or CSI-RS beams to use as a QCL association for the one or more downlink or uplink channels that are QCLed with the one or more blocked beams.

25. The UE of claim 19, wherein the one or more processors are further configured to:
refrain from monitoring downlink messages associated with one or more transmission configuration indication (TCI) states that correspond to the one or more blocked beams while the one or more blocked beams are unavailable; and refrain from transmitting uplink messages associated with one or more channels having spatial relationships with the one or more TCI states that correspond to the one or more blocked beams while the one or more blocked beams are unavailable.

26. A base station for wireless communication, comprising:
a memory; and
one or more processors coupled to the memory, the one or more processors configured to:
  transmit, to a user equipment (UE), an indication identifying one or more blocked beams that are unavailable to use for an uplink or downlink communication during a time period or a time pattern in which the indication is valid or until a subsequent indication is received by the UE indicating that the one or more blocked beams are available to use for a subsequent uplink or downlink communication;
  determine one or more beams to use for communication with the UE during the time period or the time pattern in which the indication is valid or until the subsequent indication is received by the UE based at least in part on the indication identifying the one or more blocked beams; and
  use the one or more blocked beams for the subsequent uplink or downlink communication based at least in part on an expiration of the time period or the time pattern in which the indication is valid or the UE receiving the subsequent indication.

27. The base station of claim 26, wherein the one or more blocked beams are unavailable to use for the uplink or downlink communication for a configured time period.

28. The base station of claim 26, wherein the one or more blocked beams are unavailable to use for the uplink or downlink communication during the time pattern, wherein the time pattern is configured in radio resource control (RRC) signaling and activated by a downlink control information (DCI) message or a medium access control (MAC) control element (MAC-CE) that includes the indication identifying the one or more blocked beams.

29. The base station of claim 26, wherein the indication further identifies one or more channels or messages for which the one or more blocked beams are unavailable to use for the uplink or downlink communication.

30. The base station of claim 26, wherein the indication indicates that the one or more blocked beams are unavailable to use for all uplink or all downlink communication.

* * * * *